United States Patent [19]
Greenfield et al.

[11] Patent Number: 5,737,227
[45] Date of Patent: Apr. 7, 1998

[54] SOFTWARE PLANNING PROGRAM FOR COATINGS

[75] Inventors: T. Kyle Greenfield, Cocoa; Charles A. Vallance; Rogest W. Dively, II, both of Satellite Beach; Gregory D. Nelson, Apopka; Ismael Rodriguez, Palm Bay, all of Fla.

[73] Assignee: Consulex Corporation, Cocoa, Fla.

[21] Appl. No.: 619,830

[22] Filed: Mar. 19, 1996

[51] Int. Cl.[6] .................................................. G06F 17/60
[52] U.S. Cl. .................. 364/464.1; 364/400; 395/201; 395/207; 395/208
[58] Field of Search .................. 364/400, 464.01, 364/464.1, 551.01; 395/201, 208, 207

[56] References Cited

U.S. PATENT DOCUMENTS

| | | | |
|---|---|---|---|
| 3,605,682 | 9/1971 | Groce et al. | 118/7 |
| 4,383,298 | 5/1983 | Huff et al. | 395/228 |
| 4,457,772 | 7/1984 | Haynes et al. | 364/138 X |
| 4,700,318 | 10/1987 | Ockman | 364/518 |
| 4,849,898 | 7/1989 | Adi | 364/419 |
| 4,902,293 | 2/1990 | Homstad | 204/298 |
| 5,040,123 | 8/1991 | Barber et al. | 364/468 |
| 5,132,920 | 7/1992 | Bellows et al. | 364/551.01 |
| 5,142,648 | 8/1992 | Fitts et al. | 364/551.01 |
| 5,148,370 | 9/1992 | Litt et al. | 364/468 |
| 5,189,606 | 2/1993 | Burns et al. | 395/210 |
| 5,202,993 | 4/1993 | Tarsy et al. | 395/700 |
| 5,216,593 | 6/1993 | Dietrich et al. | 364/402 |
| 5,216,612 | 6/1993 | Cornett et al. | 364/468.02 |
| 5,229,840 | 7/1993 | Amarson et al. | 356/381 |
| 5,291,397 | 3/1994 | Powell | 364/402 |
| 5,401,317 | 3/1995 | Cox et al. | 118/712 |
| 5,437,773 | 8/1995 | Glass et al. | 204/153.11 |
| 5,617,342 | 4/1997 | Elazouni | 364/578 |
| 5,648,919 | 7/1997 | Yamauchi et al. | 364/578 |

OTHER PUBLICATIONS

Zero Defects™ Nov. 1995 Sales Brochure for Corrosion Control Program.
Williams Insight™ Nov. 30, 1995 Sales Brochure, Computerized Economic Maintenance Program for Comprehensive Control.
Nov. 1995 Reprint from Materials Performance, vol. 34, No. 11, pp. 33–36 (1995) Nov., Copyright 1995 by NACE International, P.O. Box 218340, Houston, TX 77218–8340.
Mar. 1991, KTA–TATOR, Inc. Sales Brochure, Issue No. One "New Products and Services Bulletin".
Consulex Corporation, Nov. 1995 Sales Brochure for Consulex Base.Coat "The Maintenance Asset Planning Software for Coatings".

Primary Examiner—Edward Cosimano
Attorney, Agent, or Firm—Brian S. Steinberger

[57] ABSTRACT

An interactive computer program for forecasting, prioritizing, planning and tracking paint, coating and lining maintenance work for the Facility assets of industrial and commercial complexes using an IBM compatible type computer. The assets include but are not limited to buildings, tanks, towers, structures, pools, docks and their sub components such as process piping, structure steel members, concrete floors, overhead cranes, blowers, pumps, motors, vehicle hoists, hardware, paneling, conduit, facades, exterior doors, interior doors, windows, and gutters that require painting over time. The novel invention uses a four step process. The first step is to break down the facility into asset groups, master components, and sub components. Second a condition survey of the master components and subcomponents is conducted followed by making work recommendations for each sub component. The third step is to develop coating system standards where coating systems, and cost data for the maintenance work is calculated. The fourth step covers work management which includes an assessment by sub component, recommendations are accepted and altered, costs are recalculated and various types of data operations are performed such as preparing management reports, historical data is reported and cost and schedule data is reported.

16 Claims, 13 Drawing Sheets

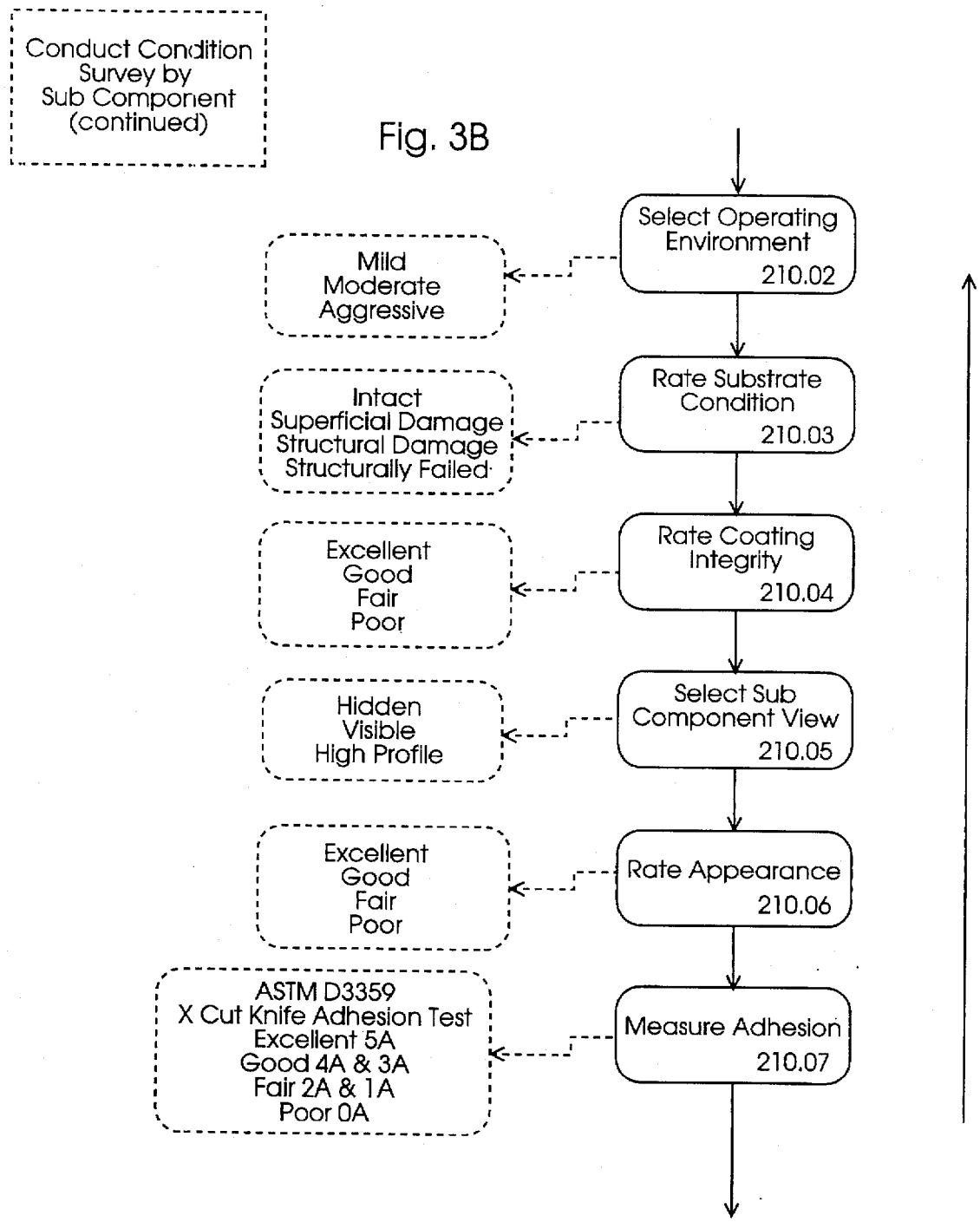

SOFTWARE PLANNING PROGRAM FOR COATINGS

This invention relates to the strategic long term planning for the maintenance of paints, coatings and linings, and in particular to a novel computer program that anticipates future work requirements and costs associated with the recoating and repainting operations for industrial and commercial facilities such as but not limited to amusement parks, resorts, petroleum refineries, paper mills, power generating stations, municipal waste and water treatment systems, off shore oil drilling platforms, chemical processing plants, pharmaceutical plants, mineral processing facilities, cement plants, food and beverage preparation plants, ships, mines, office buildings, sports stadiums, automobile production and assembly plants, steel mills, electronic component manufacturing facilities, bakeries, manufacturing plants, agricultural production facilities, textile mills, lumber operations, printing and publishing plants, marinas, aircraft manufacturing plants, government aerospace facilities, railroad equipment manufacturing and repair facilities, pipelines and related equipment.

BACKGROUND AND PRIOR ART

Industrial and commercial facilities am comprised of numerous components and sub components which require regular inspection to determine when recoating and repainting projects should occur. For example, a chemical processing facility can have master components such as storage buildings, production areas, tanks, cracking towers, platforms, pressure vessels and sub components such as piping, structural steel members, concrete floors, overhead cranes, blowers, pumps, motors, valves, conduit, exterior doors, interior doors, windows, and gutters that require repainting over time. Thus, the larger and more complex the facility, the greater the task of planing for recoating and repainting projects. Many facilities are not re-coated and repainted until natural weather conditions have deteriorated the surfaces to a point of needing recoating/repainting immediately. By this time, the substrate of the master or sub component could be damaged as well. Thus, there would be additional labor, material and equipment costs to repair the substrate as well as the labor, material and equipment costs associated with the recoating and repainting operations. Constantly re-inspecting the master components and sub components of the facilities to determine the various recoating and repainting needs requires the expenditure of considerable engineering manpower resources. The organizing, cataloging and retrieving of the data collected by the constant re inspections in a manner which is beneficial to a facility, is extremely difficult if not impossible. These tasks are further exacerbated with large scale facilities that include multiple storage buildings, production areas, tanks, cracking towers, platforms, pressure vessels and sub components such as piping, structural steel members, concrete floors, overhead cranes, blowers, pumps, motors, valves, and conduits.

Several U.S. patents will now be described that fail to adequately solve the above problems. U.S. Pat. No. 3,605,682 to Groce et al. describes a coating computer but does not apply to structures, facilities and the like. U.S. Pat. No. 4,902,398 to Homstad describes a software program for coating materials in a vacuum environment and does not encompass facilities such as exterior building structures. U.S. Pat. No. 5,142,648 to Fills et al. describes a system restricted for paint inspections using video cameras to monitor painting automobiles. U.S. Pat. No. 5,437,773 to Glass et al. is restricted to an environmental and corrosion monitoring system. Other patents that do not solve the above problems include U.S. Pat. No. 5,229,840 to Arnarson et al. and U.S. Pat. No. 5,401,317 to Cox et al.

Thus, the need exists for a solution to the above identified problems.

SUMMARY OF THE INVENTION

The first objective of the present invention is to provide a long range strategic maintenance planning tool for recoating and repainting facilities their master and sub components of facilities which tracks and reports what work needs to be done, when the work should be done and how much the work will cost.

The second objective of this invention is to provide a long range strategic maintenance planning tool for recoating and repainting master and sub components of facilities that prioritizes the maintenance work requirements for coating and lining systems.

The third objective of this invention is to provide a long range strategic maintenance planning tool for recoating and repainting master and sub components of facilities that forecasts future work requirements and annual budget estimates.

The fourth objective of this invention is to provide a long range strategic maintenance planning tool for recoating and repainting master and sub components of facilities that tracks and reports performance of installed coating and lining systems.

The fifth objective of this invention is to provide long range strategic maintenance planning tool for recoating and repainting master and sub components of facilities that pinpoints coating and lining failure trends.

The sixth objective of this invention is to provide a long range strategic maintenance planning tool for recoating and repainting master and sub components of facilities that schedules condition survey inspections.

The seventh objective of this invention is to provide a long range strategic maintenance planning tool for recoating and repainting master and sub components of facilities that stores, analyzes and reports condition survey data.

The eighth objective of this invention is to provide a long range strategic maintenance planning tool for recoating and repainting master and sub components of facilities that archives historical coating condition data for future reference.

The ninth objective of this invention is to provide a long range strategic maintenance planning tool for recoating and repainting a facility's components that compliments resource and manpower programs.

The novel software algorithm program are used primarily in mechanical component maintenance departments to write daily work orders for repairs and preventative maintenance. The invention can be used to track and report daily and weekly manpower utilization by maintenance departments and not for budgeting or prioritizing work to be performed.

The novel invention includes a graphical Windows™ type based user interface. This interface promotes a pro-active approach to performing maintenance work. The invention can further be user customized in order to help plan work packages that take advantage of economies of scale. The outputs can be interactive reporting and include planning screens which allows for strategic use of available funding for particular applications. The invention allows for "what-if?" scenarios in forecasting and work planning and reduces overall maintenance costs through more effective planning. The invention collects, stores and analyzes critical maintenance data and provides an accurate method of forecasting annual coating maintenance costs. The novel invention tracks effectiveness of completed work and significantly reduces planning time. The invention allows the user to track planned verses actual costs and allows historical data to be quickly retrieved. The novel invention allows for extensive analysis and reporting capabilities and provides immediate access to critical maintenance data and further provides detail at the facility, master component, or sub component levels.

Further objects and advantages of this invention will be apparent from the following detailed description of a presently preferred embodiment which is illustrated schematically in the accompanying drawings.

BRIEF DESCRIPTION OF THE FIGURES

FIG. 3B is a flow chart representation of another portion of step 200 of FIGS. 1A–1B.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
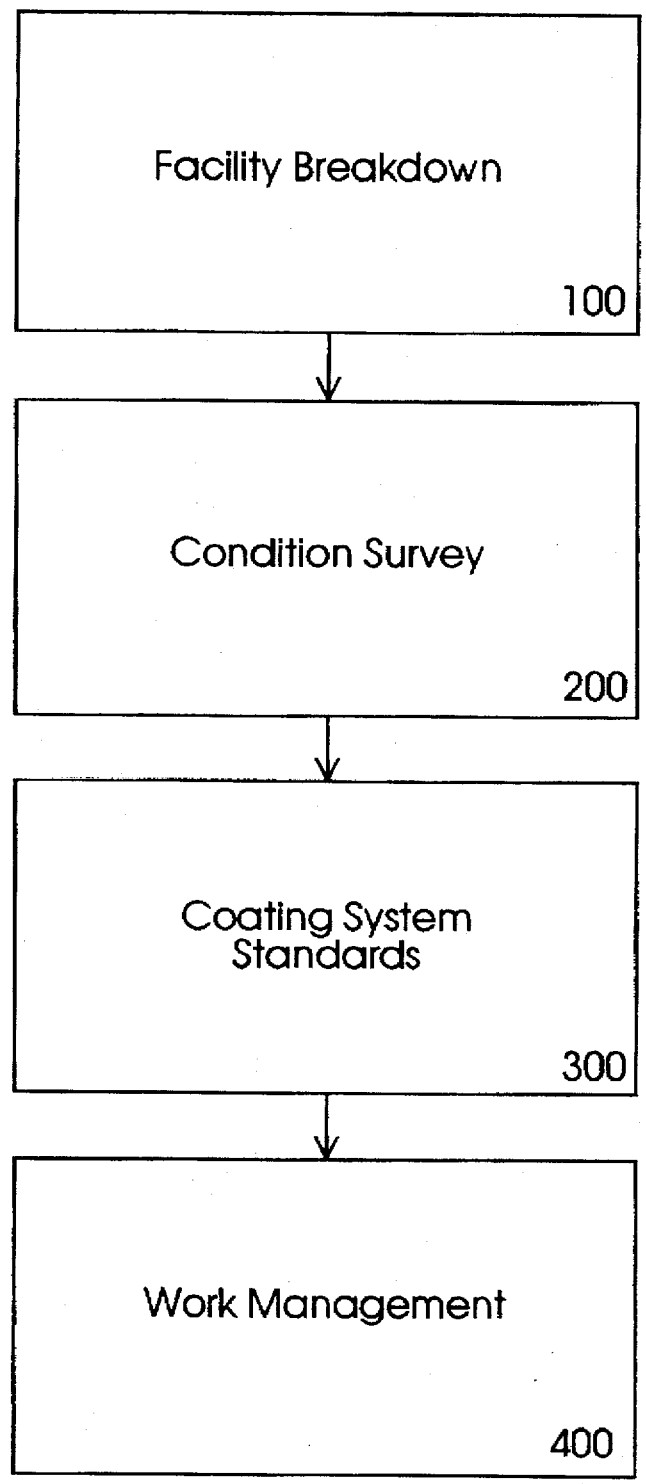
FIG. 1A is an overview flow chart of the four step implementation process for the invention.
Figure 1B:
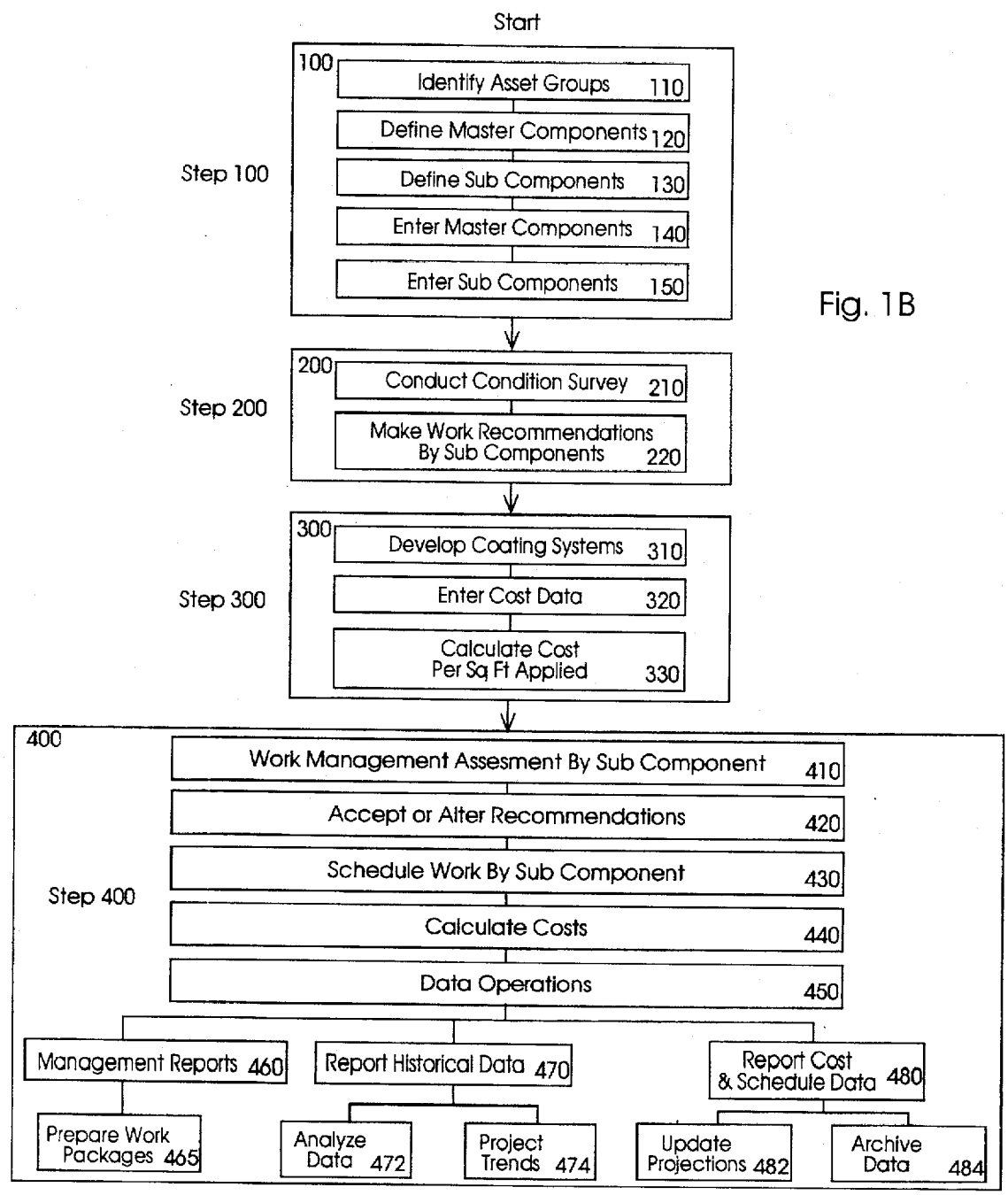
FIG. 1B is a detailed view of the four step implementation process of FIG. 1A.

The invention incorporates a novel four-step implementation process which will first be briefly described in reference to FIG. 1A and followed by an in depth description in reference to FIG. 1B. Referring to FIG. 1A, the first step 100 is a facility breakdown where each facility is organized into manageable components. The second step 200 is a condition survey where the facility is inspected to determine the baseline condition and in order to collect necessary data. The third step 300 encompasses coating system standards to select the coating systems to be used. The fourth step 400 encompasses work management to forecast, plan and track coating maintenance work using interactive screens, data generating reports and the like.

FIG. 1B is a detailed overview of the four step implementation process of FIG. 1A. For the facility breakdown, five substeps: Identify Asset Groups 110, Define Master Components 120, Define Sub Components 130, Enter Master Components 140 and Enter Sub Components 150 are followed. Table 1 gives a detailed description of the implementation process for each of the five substeps 110–150 of Step 100.

Step 100-Facility Breakdown/Asset Grouping

TABLE 1

| | |
|---|---|
| Enter Master Components 140 | Each master component is entered into the computer by its identification number. Also entered is a brief description of the master component, the type of component it is (decorative, facade, operational or structural), the date of the entry, the criticality of the master component to the desired operation of asset group (non-critical, moderate or critical) and a notation as to location. |
| Enter Sub Components 150 | Each sub component of each master component is entered into the computer by its identification number, under each master component's identification number. The sub component identification numbering system is a subset of the master component's numbering system, which allows for planning and prioritizing by both master component relationships or by other broader relationships, such as process systems. Also entered is a brief description of the sub component, the date the sub component was created, the substrate material (concrete, steel, aluminum, wood, fiberglass, drywall, etc.), the criticality of the sub component to the master component (non-critical, moderate, critical), the total surface area of the sub component which has been measured or calculated for each sub component's parts and summarized as a total, the elevation and location of the sub component. If a digitized picture of the sub component is available, it may be attached to this record at this time. |

Referring to FIGS. 1A–1B, the Condition Survey Step 200 includes two substeps: Conduct Condition Survey 210 and Make Work Recommendations by Sub Components 220. Table 2 gives a detailed description of the implementation process for each of the two substeps 210.01–210.13 and 220.10–220.20 of Step 200.

Step 200-Condition Survey

TABLE 2

| Sub Step Description | Implementation Process |
|---|---|
| Conduct Condition Survey 210 | Each sub component is visually inspected to rate and record a number of physical attributes. This information is then input into the software program. The attributes that are observed, rated and recorded are: 210.01–210.13 |
| Exposure type 210.01 | The sub component's exposure type is observed and entered as atmospheric, ultraviolet, acidic, alkaline, immersion, splash zone, salt spray and high temperature. All that apply to this sub component are entered. |
| Operating environment 210.02 | The sub component's operating environment is rated as one of the three types of operating environments-mild, moderate or aggressive. |
| Substrate condition 210.03 | The substrate condition of each sub component is rated as intact, superficial damage, structural damaged or structurally failed. |
| Coating integrity 210.04 | The coating integrity of the existing coating is rated as excellent, good, fair or poor. |

TABLE 2-continued

| Sub Step Description | Implementation Process |
| --- | --- |
| Select SubComponent View 210.05 | The location of the sub component is evaluated as to the ability to be seen by the public. The ratings are hidden, visible and high profile. |
| Rate Appearance 210.06 | The overall appearance of the sub component is rated by the surveyor/inspector. The values of this attribute are excellent, good, fair and poor. |
| Measure Adhesion 210.07 | The adhesion of the existing coating to the substrate is rated as excellent, good, fair or poor. This rating can be correlated with ASTM Adhesion Test Method D3359. |
| Defect Ratings 210.08 | The sub component is inspected for any of 17 coating defects. Once a defect is observed, it is rated as to its frequency (minor, random, medium or extensive), its possible consequences if left un repaired (aesthetic, coating failure, structural collapse or creation of a safety concern); the percentage of the sub component's area (0–100%) that is affected by each observed defect is measured and recorded |
| DFT (Dry Film Thickness) 210.09 | The dry film thickness of the existing coating is measured using the appropriate test equipment. Several representative measurements are made and recorded in the DFT table to allow the software to calculate an average coating thickness. |
| Hazardous Operations 210.10 | If the surveyor/inspector determines that a hazardous material/condition may result for work on this sub component-a notation is made as to the potential hazard present. |
| Inspection Frequency 210.11 | Based on the surveyors/inspectors observations and experience, the desired inspection frequency is selected for this sub component-the choices are monthly, semi annually and annually. |
| Survey/Inspect Comments 210.12 | Any comments that the surveyor/inspector feels appropriate are recorded at this time. |
| Assign picture 210.13 | If a digitized photograph is available, it may be attached to the record at this time. |
| Recommended work task 220 220.10 | Based on the surveyors/inspectors observations and experience, a recommended work task may be made from the following: inspect (sub component), touchup (coating), re-coat (apply coating over the entire surface area of the sub component), replace (coating) or (remove and replace with) new construction |
| Application Cost Multipliers 220.20 | Any conditions which are observed which, in the opinion of the surveyor/inspector, will raise the installation cost of the coatings; is noted. The default conditions are barricades, scaffolding, rigging, and confined space; more can be added to accommodate each facility's needs. |

Referring FIGS. 1A–1B, the Coating System Standards Step 300 includes three substeps: Develop Coating Systems 310, Enter Cost Data 320 and Calculating Cost Per square Foot Applied 330. Table 3 gives a detailed description of the implementation process for each of the three substeps 310.01–310.11,320 and 330 of Step 300.

Step 300-Coating Systems Standards

TABLE 3

| Sub Step Description | Implementation Process |
| --- | --- |
| Develop Coating Systems 310 | Coating systems are built to perform specific functions for each facility. The user enters the data based on his/her experience and/or recommendations from others. |
| Coating System Id 310.01 | The user determines the number and name of each required coating system in advance of starting this sub step. The system name should be descriptive of the role the system will perform at the facility. |
| System Description 310.02 | A brief description of each system is entered to assist in identification. |

TABLE 3-continued

| Sub Step Description | Implementation Process |
| --- | --- |
| Surface Preparation Method 310.03 | The various surface preparation methods that will be used, or can expected to be used at this facility are entered into the software. Each method is given a unique description; the various attributes that are researched and entered are: name of surface preparation method and the labor, material and equipment cost per square foot to perform this method of surface preparation. |
| Coating Material Entry 310.04 | The various coating materials that will be used to build the coating systems are entered. The materials are selected based on recommendations of the coating vendors, outside coating consultants, from the experience of the coatings engineer at the facility or from other sources. A unique material identification number is given to each coating material entered. The material identification number should be descriptive of the material without being longer than 10 characters. Other attributes of the coating material that are researched and entered at this time are: manufacturer's name, product name, generic type (alkyd, latex, epoxy and polyurethane for example), percent solids by volume, cost per gallon, recommended dry film thickness range per coat of material and VOC's (volatile organic compounds) in pounds per gallon. |
| Application Method 310.05 | Various application methods are now entered into the software. These methods can be based on the requirements of the coating materials previously entered, on recommendations from outside sources or from the experiences of the coating engineer at the facility. The user is required to enter the application method name, the estimated material transfer efficiency percentage (the ratio of the amount of coating material that is present at the start of the application method to the amount of coating material that is deposited on the substrate; expressed as a percentage), the labor and equipment costs per square foot for this application method. |
| Coating System Type 310.06 | The coating system being built is identified as to its applicability to the facility's needs. All applications that apply are selected from the following: touchup, re coat, replace or new construction. |
| Coating System Purpose 310.07 | The primary system purpose is selected from the following: architectural, lining, protective coating, sacrificial, decorative or other uses which may be user defined. |
| Surface Preparation 310.08 | The required level of surface preparation for this system is chosen. Only one type of surface preparation per coating system is allowed. |
| Material 1- Design Basis 310.09 | For the 1$^{st}$ material used, the design basis is chosen. The design basis is simply the name given for a specific coating material, such as Sherwin William's Promar" 400 latex Eg-Shel Enamel, B20 W 400 Series which is the "basis" of the design of this particular system. |
| Number of Coats 310.10 | Determine the number of coats of this material that will be applied for this coating system and enter the number in the software. |
| Application Method 310.11 | Select the appropriate application method for this coating system from those previously entered. See 310.05 |
| Enter Cost Data 320 | Enter Surface Preparation cost, coating material cost (i.e. can of paint), and coating application cost (labor, equipment to apply paint) into software. Surface preparation cost includes Cost of material (i.e. sand for sand blower), labor cost to install, and equipment cost |
| Calculate Cost per Sq Ft 330 | Calculate the cost per square foot applied and enter the data into the computer. |

Referring FIGS. 1A–1B, the Work Management Step 400 includes: Work Management Assessment By Sub Component 410, Accept or Alter Recommendations 420, Schedule Work By Sub Component 430, Calculate Costs 440, Data Operations 450, Management Reports 460, Report Historical Data 470 and Report Cost & Schedule Data 480. Table 4 gives a detailed description of each of the substeps 410–450 and reports 460–480.

Step 400-Work Management

TABLE 4

| Sub Step Description | Implementation Process |
| --- | --- |
| Work Management Assessment By Sub Component 410 | Each sub component's condition and recommended work task is reviewed by either the administrator or an engineering user. |
| Accept or Alter Recommend 420 | Based on the expertise, experience and knowledge of the facility's budgetary requirements, the administrator or engineering user either accepts or alters the inspector/surveyor's recommendations relating to each sub component. |
| Schedule Work by Sub Component 430 | Based on the expertise, experience and knowledge of the facility's budgetary requirements and operational requirements, the administrator or engineering user schedules work on each of the sub components. |
| Calulate Costs 440 | After the review and assessment process is complete, the program automatically updates all calculated costs (substep 320, 330) based on the recent inputted information. |
| Data Operations 450 | The administrator or engineering user performs reporting, data analyzing and archiving operations depending on the requirements of the facility. Data operations include: management reports 460 and prepare work packages 465, report historical data 470 analyze data 472 and project future trends 474, report cost and schedule data 480, update projections 482 and archive data 484 |

Figure 2:
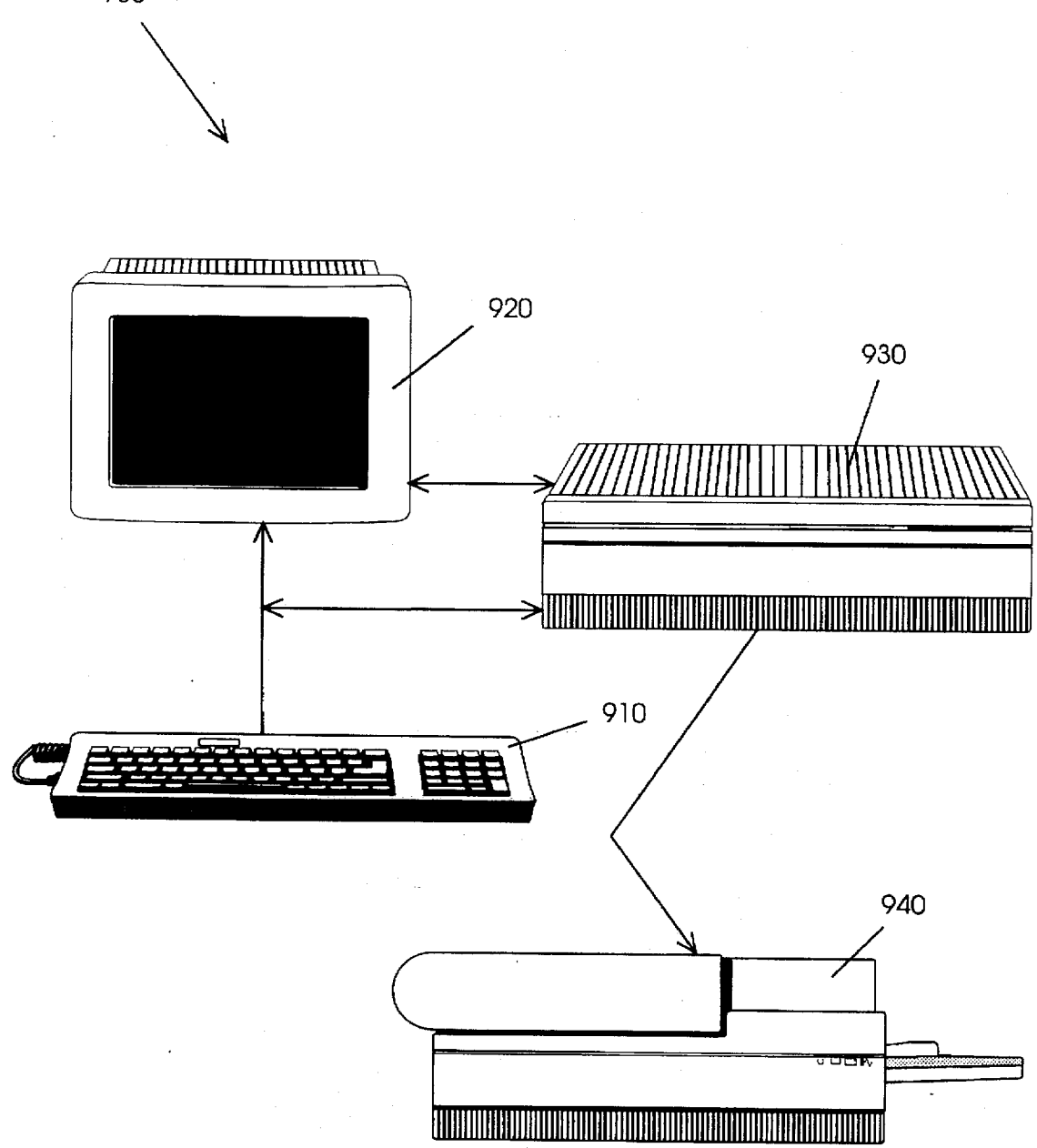
FIG. 2 illustrates a preferred computer equipment set-up for using the novel four step implementation process of FIGS. 1A–1B.

FIG. 2 illustrates a preferred computer equipment set-up 900 for using the novel four step implementation process 100, 200, 300 and 400 of FIGS. 1A–1B. A keyboard 910 can be used to input the facility breakdown data of step 100 and the condition survey data of step 200 onto a computer 930 such as but not limited to an IBM compatible 386SX processor, an IBM compatible 586, Macintosh Power PC and the like, with at least 4 megabytes minimum RAM, (8 recommended), a hard disk with 30 megabytes of available space with a color VGA monitor or high resolution monitor 920. The program running the computer 930 can be written in C++ Windows™, and the like. A preferred software algorithm flow chart for the computer program is described in reference to FIGS. 3A–3H. Computer 930 can perform calculations needed from steps 200, and the coating system standards 300. Final work management output step 400 can be displayed on conventional display screens 920 and output in hardcopy form at laser printer 400 such as but not limited a Hewlet Packard Printer 5M, 5ML, an ink jet or the like(dot matrix not recommended).

Figure 3A:
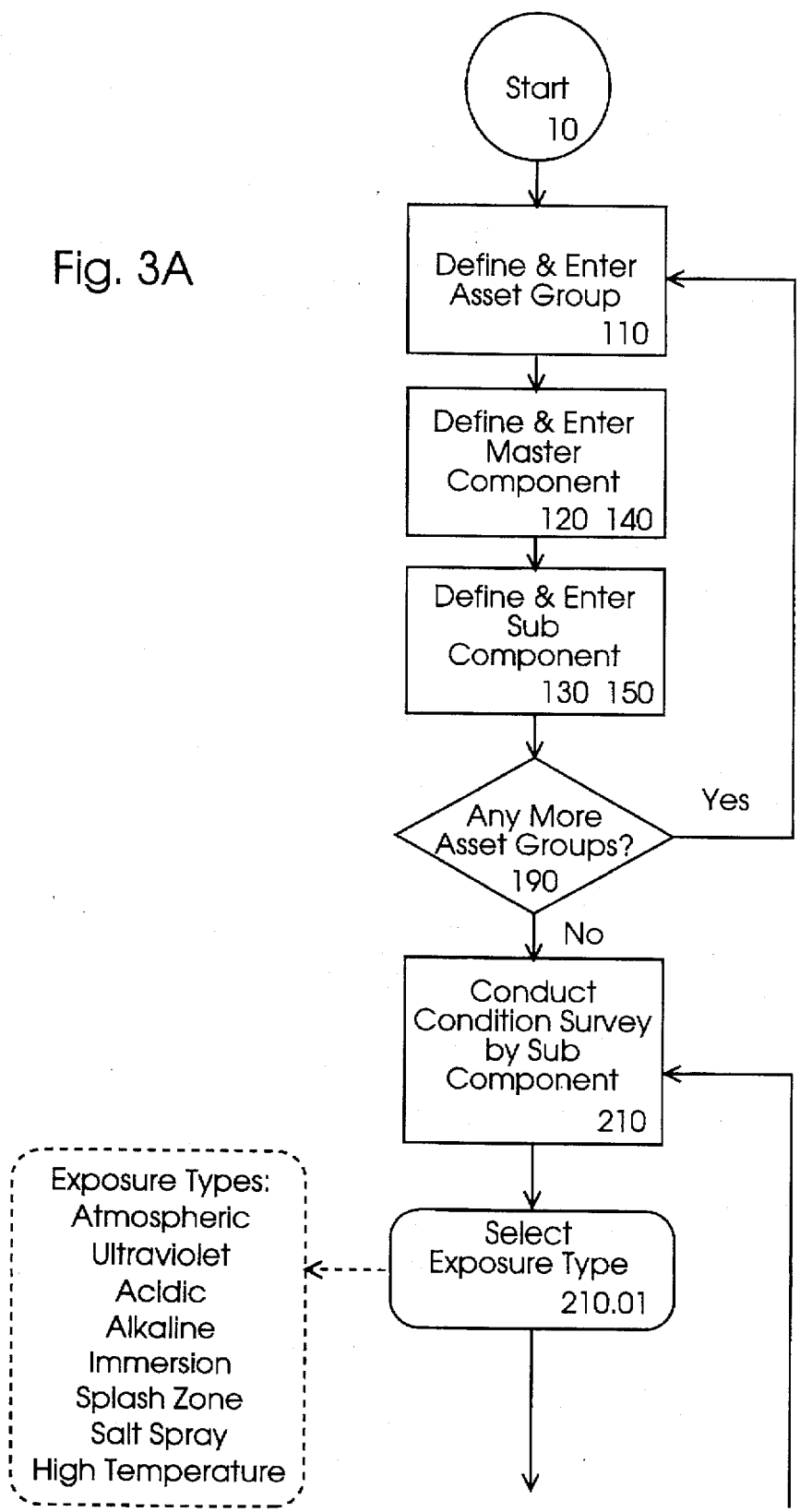
FIG. 3A is a flow chart representation of Step 100 and part of step 200 of FIGS. 1A–1B.

FIG. 3A is a flow chart representation of Step 100 and part of step 200 of FIGS. 1A–1B. From start 10, defines and enters asset group data 110, defines and enters master component data 120, 140, defines and enters sub component data 130, 150. After which the program can prompt back whether any more asset groups are to be listed 190. If yes, box 110 is repeated, if no the program begins to conduct a condition survey by Sub component 210. Next the user selects the exposure type 210.01 from a menu which includes: atmospheric, ultraviolet, acidic, alkaline, immersion, splash zone, salt spray and high temperature.

FIG. 3B is a flow chart representation of another portion of step 200 of FIGS. 1A–1B. The user next selects the operating environment 210.02 from the choices: mild, moderate or aggressive. The user then rates the substrate condition 210.03 from the choices: intact, superficial damage, structural damage and structurally failed. Next the existing coating integrity is rated 210.04 from the choices: excellent, good, fair and poor. The sub component visual view 210.05 is now selected such as hidden, visible and high profile. The user can then rate the visual appearance 210.06 from the choices: excellent, good, fair and poor. The adhesion of the current coating 210.07 can be measured using an ASTM D3359 X cut knife Adhesion Test where the user selects one of the choices: excellent, good, fair, and poor.

Figure 3C:
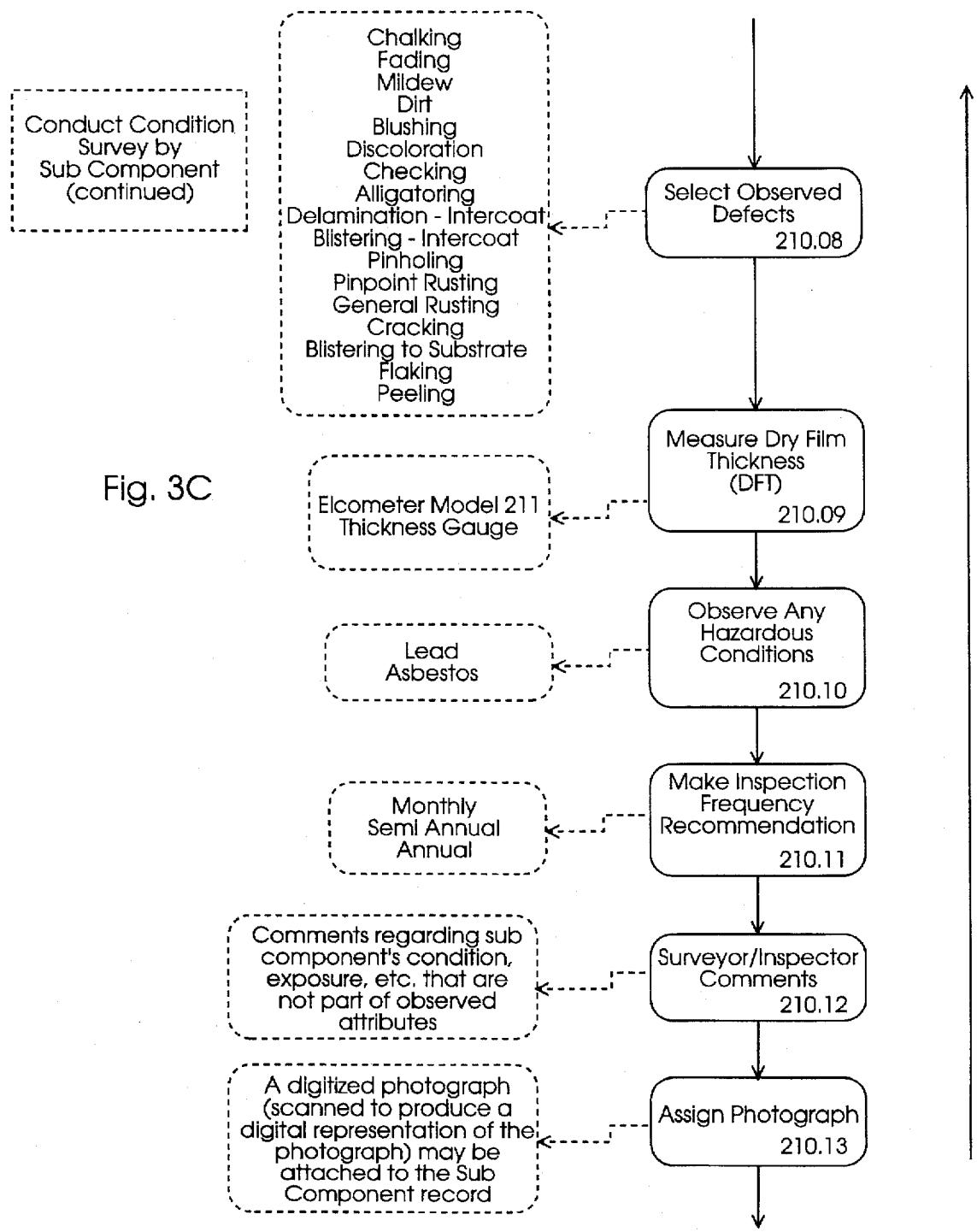
FIG. 3C is a flow chart representation of another portion of step 200 of FIGS. 1A–1B.

FIG. 3C is a flow chart representation of another portion of step 200 of FIGS. 1A–1B. The user next selects the observed defects 210.08 from the choices: chalking, fading, mildew, dirt, blushing, discoloration, checking, alligatoring, delamination-intercoat, blistering-intercoat, pinholing, pinpoint rusting, general rusting, cracking, blistering to subsrate, flaking and peeling. The user inputs the measured dry film thickness value 210.09 measured by an Elcometer Model 211 Thickness Gauge. Next any observed hazardous conditions 210.10 such as lead or asbestos are input. The user next makes an inspection frequency recommendation 210.11 from the choices: monthly, semi annual, and annual. Next the surveyor/inspector can input comments 210.12 where the comments are regarding the sub component's condition such as exposure, etc. that are not part of the observed attributes. Next, a digitized photograph can be assigned 210.13 where the photograph can be scanned to produce a digital representation as part of the sub component record.

Figure 3D:
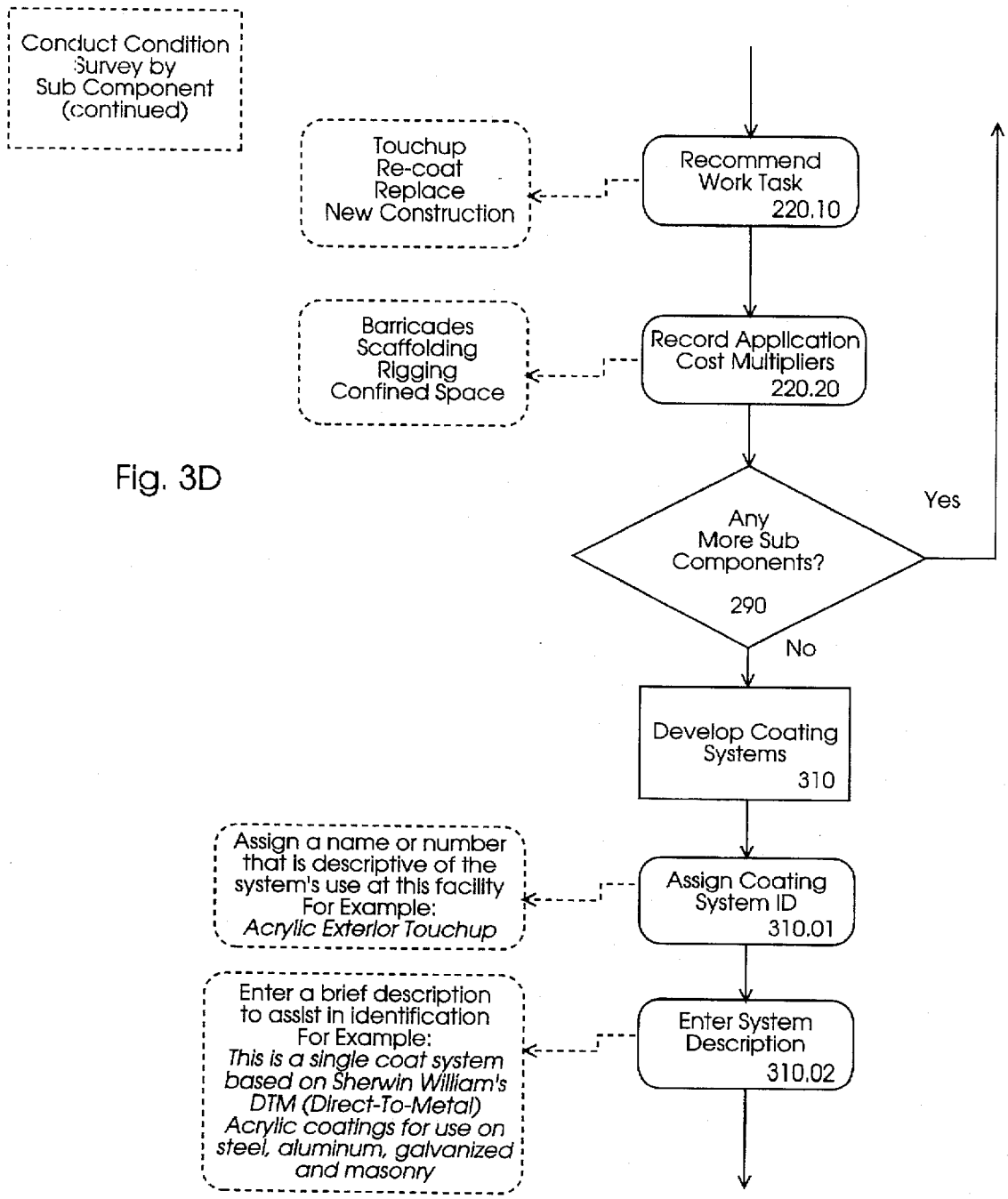
FIG. 3D is a flow chart representation of another portion of step 200 and a portion of step 300 of FIGS. 1A–1B.

FIG. 3D is a flow chart representation of another portion of step 200 and a portion of step 300 of FIGS. 1A–1B. The next input is where the user recommends the work task 220.10 from the choices: touchup, re-coat, replace, and new construction. Next, the application cost multipliers are recorded 220.20. These are specific problems that will increase the cost of maintenance such as barricades, scaffolding, rigging and confined space. The program prompts the user whether any more sub components are to be listed 290. If yes, substep 210 is repeated, if no, the coating systems step 300 begins where the program starts to develop coating systems 310. Next, a coating system ID is assigned 310.01 where a name or number is assigned that is descriptive of the systems used at this facility such as acrylic exterior touchup. Next a system description is entered 310.02 where a brief description is entered to assist in identification. For example: this is a single coat system based on Sherwin Williams® DTM(Direct-to-Metal) Acrylic coatings for use on steel, aluminum, galvanized and masonry.

Figure 3E:
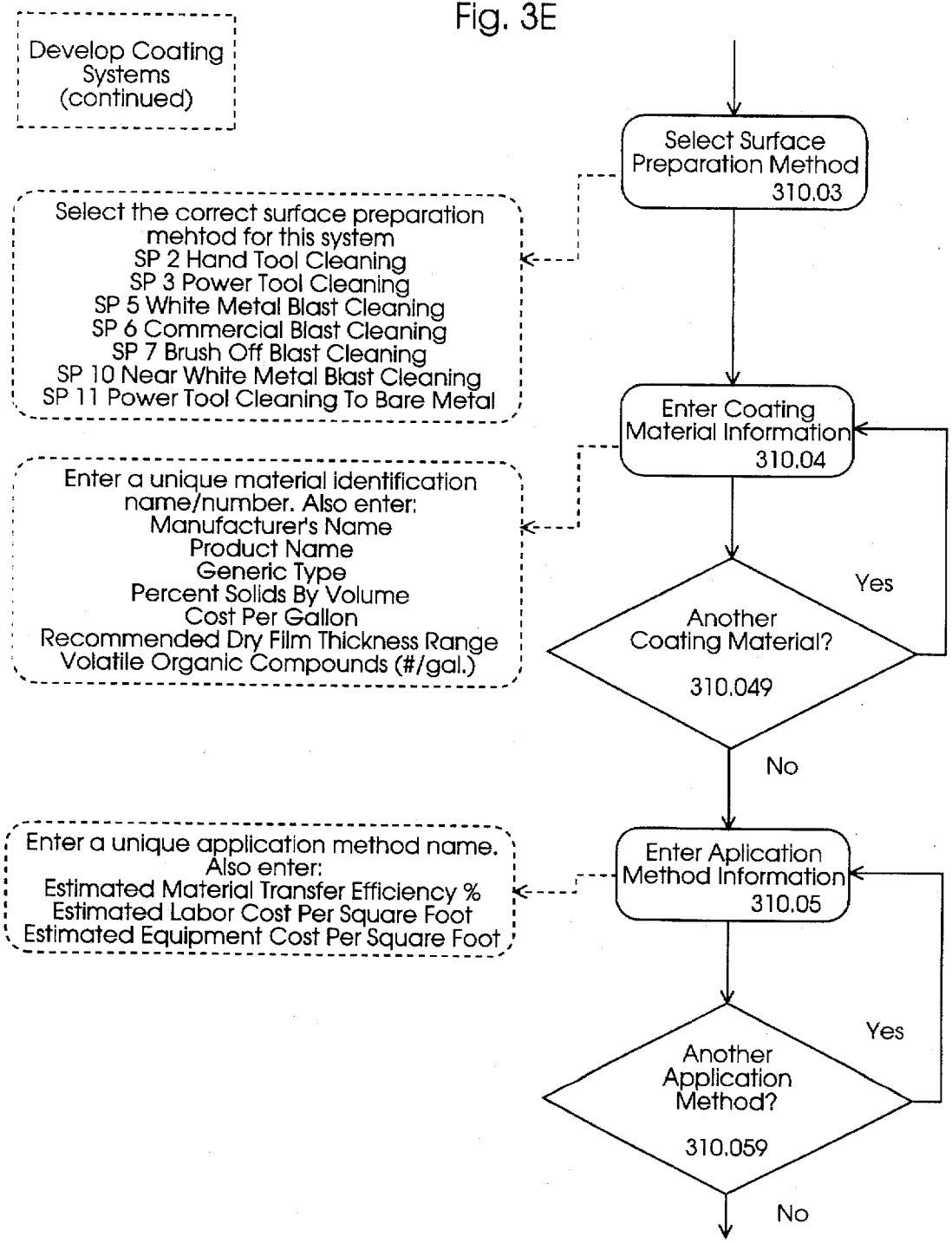
FIG. 3E is a flow chart representation of another portion of step 300 of FIGS. 1A–1B.

FIG. 3E is a flow chart representation of another portion of step 300 of FIGS. 1A–1B. The next step is for the user to select the surface preparation method 310.03 from hand tool cleaning, power tool cleaning, white metal blast cleaning, commercial blast cleaning, brush off blast cleaning, near white metal blast cleaning, and power tool cleaning to bare metal. Next the coating material information is entered 310.04. A unique material identification is entered such as name/number, manufacturers name, product name, generic type, percent solids by volume, cost per gallon, recommended dry film thickness range, and the volotile organic compounds. A prompt asks if another coating material exists 310.049. If yes substep 310.04 is repeated, if no then the user is asked to enter application method information 310.05. Here, a unique application method name is entered including the estimated material transfer efficiency percent, the estimated labor cost per square foot, and the estimated equipment cost per square foot. A prompt asks if there is another application method 310.059. If yes, then substep 310.05 is repeated, if no the next substep 310.07 occurs.

Figure 3F:
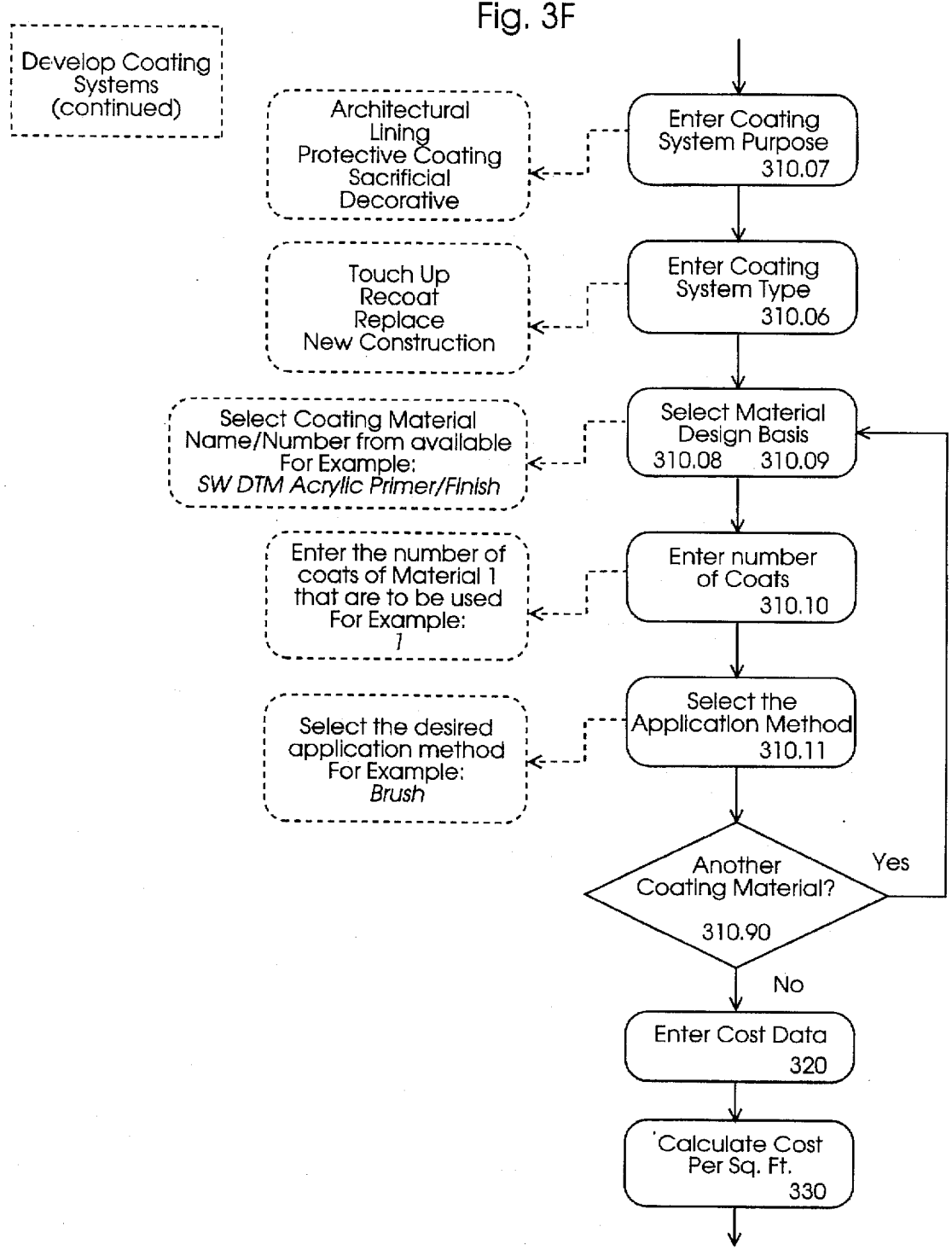
FIG. 3F is a flow chaff representation of the remaining portions of step 300 of FIGS. 1A–1B.

FIG. 3F is a flow chart representation of the remaining portions of step 300 of FIGS. 1A–1B. The coating system purpose is entered 310.07 from choices such as architectural, lining, protective coating, sacrificial, and decorative. Next, the coating system type is entered 310.06 such as touchup, recoat, replace, and new construction. Next the material design basis is selected 310.08–310.09 from the choices: selected coating material (name/number) such as SW DTM acrylic primer/finish. Next the number of coats of material that are to be used such as one substep 310.10, as previously described in TABLE 3 shown above. Next, the desired application method is selected 310.11 for example: brush, roll and the like. The user is prompted whether there is another coating material 310.90. If yes then substep 310.08–310.09 is repeated, if no the cost data is entered 320 followed by the calculated cost per square foot 330.

Figure 3G:
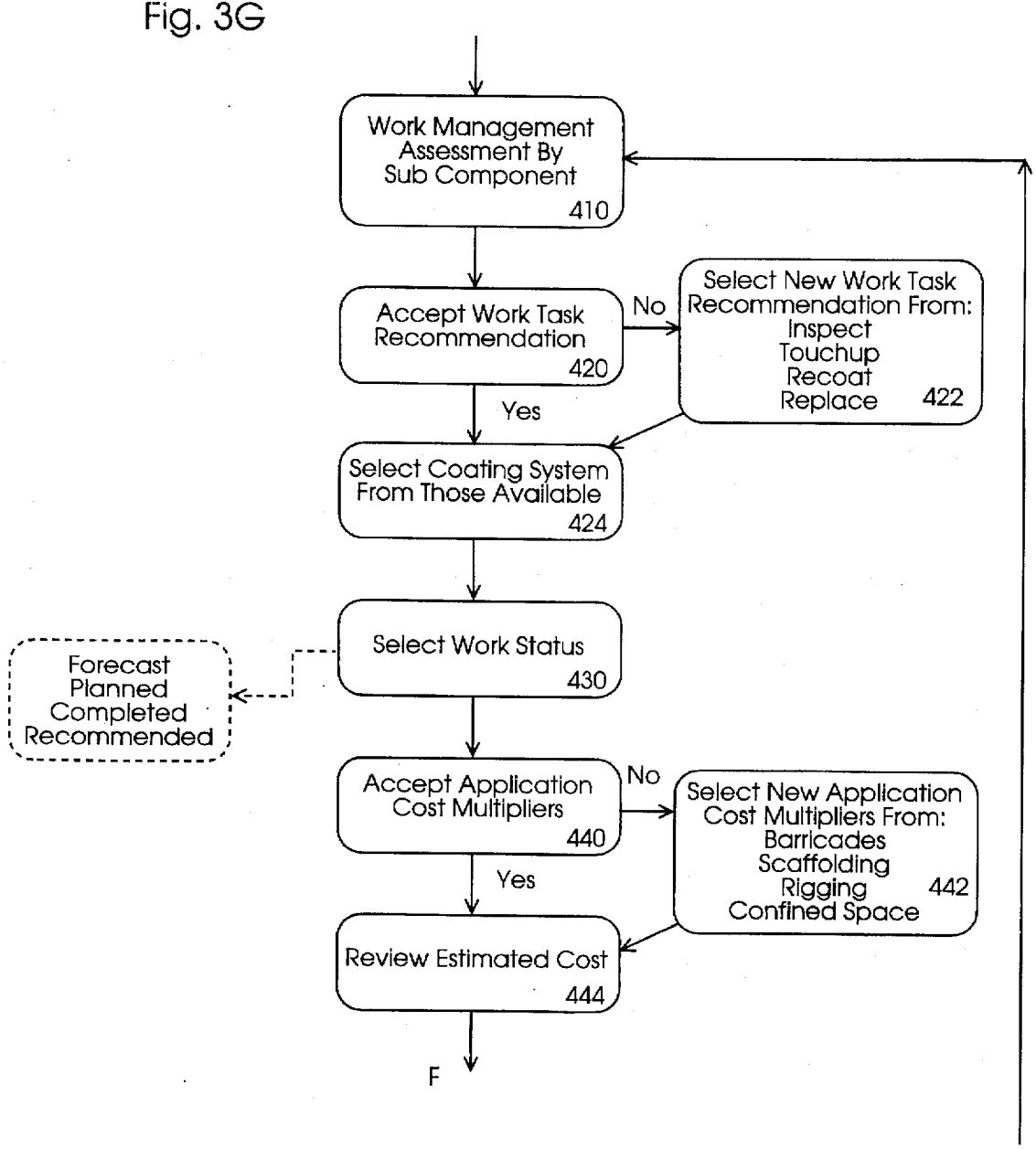
FIG. 3G is a flow chart representation of a portion of step 400 of FIGS. 1A–1B.

FIG. 3G is a flow chart representation of a portion of step 400 of FIGS. 1A–1B. The next step is for work management assessment by sub component 410. Next the user is asked whether to accept the work task recommendation 420. If no, the user is asked to select new work task recommendation 422 from: inspect, touchup, recoat and replace, and then passes to 424. If yes is the answer to box 420, then the program selects the coating system from those available 424. Next, the work status is selected 430 from the choices: forecast, planned, completed, and recommended. Next, the user is asked whether they accept the application cost multipliers 440 previously inputted. If no, then the user selects new application cost multipliers 442 from: barricades, scaffolding, rigging, and confined space, and then to box 444. If yes is the answer to box 440, then the estimated cost is reviewed 444.

Figure 3H:
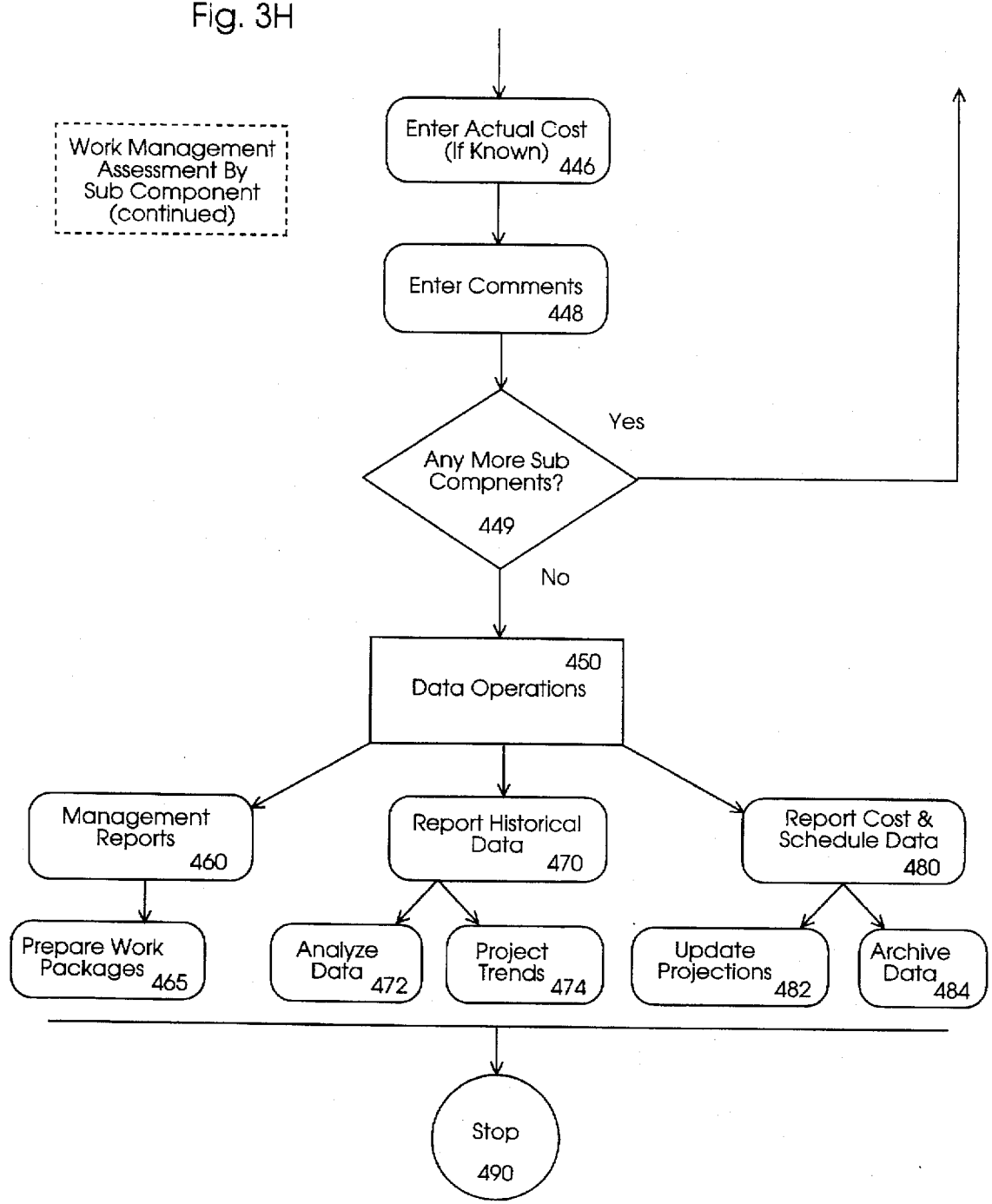
FIG. 3H is a flow chart representation of the remaining portion of step 400 of FIGS. 1A–1B.

FIG. 3H is a flow chart representation of the remaining portion of step 400 of FIGS. 1A–1B. The next step is to enter the actual cost, if known 446. Comments of the user can be entered at substep 448. The user is prompted whether any more subcomponents are to be evaluated 449. If yes then substep 410 is repeated, if no then data operations 450 begins where management reports 460, historical data 470, cost and schedule data 480 can be output on screen or printed out, before the program ends at step 490.

Figure 4:
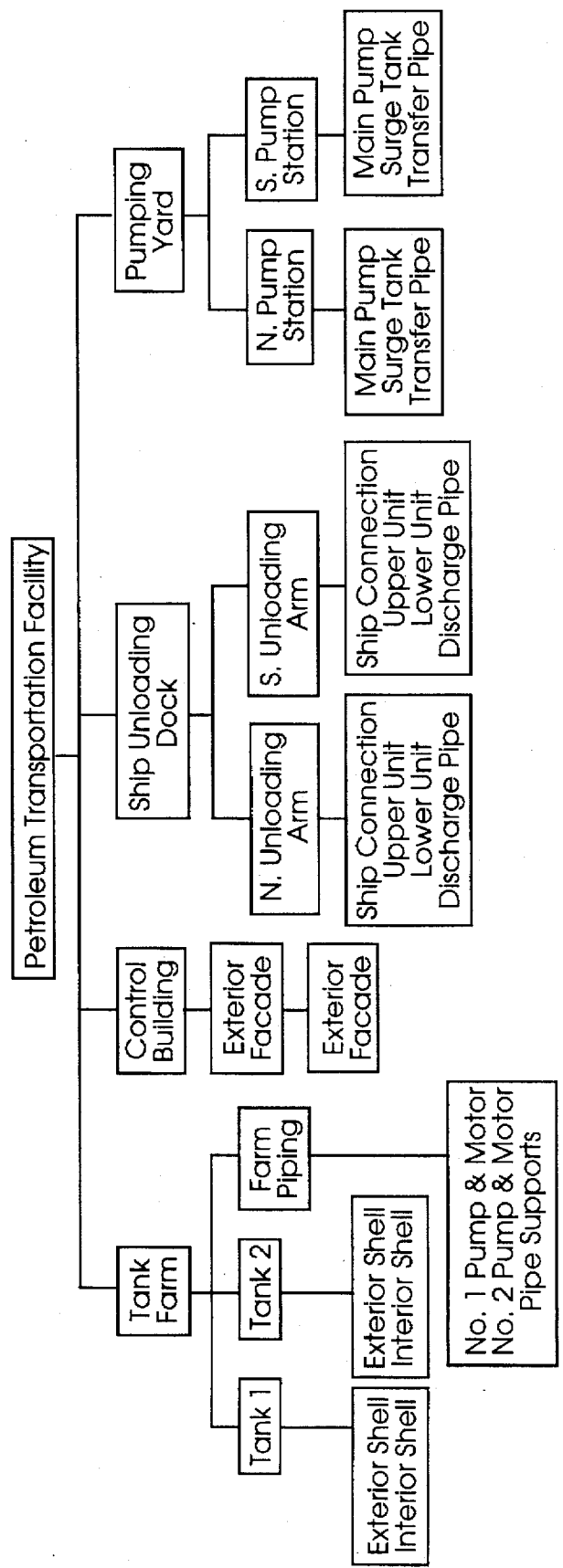
FIG. 4 illustrates a exemplary facility 600 having major components and subcomponents that can benefit from the subject invention.

FIG. 4 illustrates an exemplary facility 600 having major components and subcomponents that can benefit from the subject invention. Referring to FIG. 4, a petroleum transportation facility includes major components such as a tank farm, control building, ship unloading dock and pumping yard. Each of the major components has subcomponents such as tank 1, tank 2 and the like. Tables 5 and 6 represents the data input for the FIG. 4 example of the asset group determination 110, and the master component 120, 140. Each of the defined asset groups, master components and sub components are entered into their respective forms. Tables 5 and 6 refer to the first step 100 of FIGS. 1A–1B.

TABLE 5

| Attribute | Data Input Example |
|---|---|
| Asset Group Determination 110 | Each selected Asset Group is entered in the Asset Group Creator with certain information-Example: Pumping Yard, This asset group consists of the various tanks, pumps and piping used to pump the oil from the tankers to the Tank Farm. Created January 5, 1996 |
| Master Component ID | Each selected Master Component is entered in the Master Component Manager with certain information-Example: |

TABLE 5-continued

| Attribute | Data Input Example |
|---|---|
| 120, 140 | S. Pump Station, This master component consists of the main pump, surge tank and transfer piping that pumps the oil from the South Tanker Unloading Arm to the Tank Farm. |

TABLE 6

| Attribute | Data Input Example |
|---|---|
| Component Type 120, 140 | Select from those displayed-Example: Operational |
| Date Master Component Created 120, 140 | Select from those displayed-Example: January 5, 1996 |
| Criticality 120, 140 | Select from those displayed-Example: Critical |
| Total Surface Area 120, 140 | None-calculated by the program based on the summation of sub component areas |
| Location 120, 140 | Enter a descriptive phrase to help identify location or enter plant coordinates |
| Sub Component Entry 130, 150 | Each sub component of the master component is entered with certain information-Example: Transfer Pipe, the transfer pipe for the south pump station, steel substrate, critical, surface area of 1,268 square feet, a picture call TRPIPE,PCX is contained on a floppy disk in drive A. |

Tables 7 and 8 represent step 200 of FIGS. 1A–1B using the FIG. 4 facility example. Each sub component is inspected and all sub component attributes and coating defects are noted in the appropriate locations on the Sub Component Evaluation Form.

TABLE 7

| Attribute | Data Input Example |
|---|---|
| Asset Group 210 | None-select from those listed-Example Pumping Yard |
| Master Component ID 210 | None-select from those listed-Example N. Pump Station: |
| Sub Component ID 210 | None-select from those listed-Example Transfer Pipe |
| Date Inspected 210 | Enter the date the sub component was inspected |
| Exposure Type 210.01 | Select all that apply from those listed-Example: weather, ultraviolet and salt spray |
| Operating environment 210.02 | Select from those listed-Example: mild |
| Substrate condition 210.03 | Select from those listed-Example: superficial damage |

TABLE 8

| Attribute | Data Input Example |
|---|---|
| Coating integrity 210.04 | Select from those listed-Example: good |
| View 210.05 | Select from those listed-Example: visible |
| Appearance 210.06 | Select from those listed-Example: good |
| Adhesion 210.07 | Select from those listed-Example: good |

TABLE 8-continued

| Attribute | Data Input Example |
|---|---|
| Defect Ratings 210.08 | Select from those listed and rate each defect-Example: chalking, minor, aesthetic & 60% and checking, minor, operational & 20% |
| DFT (Dry Film Thickness) 210.09 | Input the measured dry film thickness into the DFT calculator, the internal calculator will input the average dry film thickness to the program-Example: readings of 5.5, 4.9, 6.1, & 5.6 are made and input into the DFT Calculator, a value of 5.5 is entered into the program. |
| Hazardous Operations 210.10 | Select from those listed-Example: none chosen |
| Inspection Frequency 210.11 | Select from those listed-Example: annual |
| Comments 210.12 | Enter any comments that may be relevant to further evaluation of this sub component-Example: Repair of miscellaneous coating damage needed now to prevent further degradation. |
| Assign Picture 210.13 | Identify the name and location of the picture for assignment-Example: A:\TRPIPE.PCX |
| Recommended Work Task 220.10 | Select from those listed-Example: Touchup |
| Recommended Coating System 220.15 | Select from those listed-Example: Acrylic Exterior Touchup |
| Application Cost Multipliers 220.20 | Select from those listed-Example: None |

Table 9 represents step 300 of FIGS. 1A–1B using the FIG. 4 facility example. Coating systems are built for each asset groups use by entry of data into the Coating System Builder Form.

TABLE 9

| Attribute | Data Input Example |
|---|---|
| Coating System ID 310.01 | Enter a unique name/number combination to identify the coating system for easy recognition in future use-Example: Acrylic Exterior Touchup |
| System Description 310.02 | Enter a brief description to assist in identification-Example: This is a single coat system based on Sherwin William's DTM (Direct-To-Metal) Acrylic coatings for use on steel, aluminum, galvanized and masonry |
| Surface Preparation Method 310.03 | Enter the surface preparation method name, along with the labor, material and equipment cost per square foot to perform this particular method of surface preparation.-Example: SP2 Hand Tool Cleaning, $0.25, $0.05, $0.05. |
| Coating Material Entry 310.04 | Enter the coating material (s) unique name, along with other attributes of that coating, such as manufacturer's name, product name, generic type (alkyd, latex, epoxy and polyurethane for example), percent solids by volume, cost per gallon, recommended dry film thickness range per coat of material and VOC's (volatile organic compounds) in pounds per gallon-Example: SW DTM Acrylic Primer/Finish, Sherwin-Williams, DTM Acrylic Primer/Finish B66W1, acrylic, 46%, $23.75, 3.0 & 2.083 |
| Application Method 310.05 | Enter the application method (s) unique name, along with other attributes of that method, such as transfer efficiency percentage, labor and equipment costs per square foot for each application method-Example: Brush, 90%, $0.35, $0.05 |
| Coating System Type 310.06 | Enter the type (s) of uses that the coating system will have at this facility, enter all types that apply to each system from those names in use at that facility-Example: touchup, recoat, replace and new construction |
| Coating System Purpose 310.07 | Enter the primary system purpose from those names in use at this facility-Example: architectural |

TABLE 9-continued

| Attribute | Data Input Example |
|---|---|
| Surface Preparation 310.08 | Enter the required level of surface preparation for this system, only one method per coating system is allowed-Example: SP2 Hand Tool Cleaning |
| Material 1-Design Basis 310.09 | Select from those listed, the name of the coating material that is the basis of the design for this particular coating system name-Example: SW DTM Acrylic Primer/Finish |
| Number of Coats 310.10 | Determine the number of coats of this material that will be included in this particular coating system name-Example: 1 |
| Application Method 310.11 | Select from those application methods listed, the method to be used to apply the coat (s) chosen for Material 1-Example: Brush |

Table 10 represent step 400 of FIGS. 1A–1B using the FIG. 4 facility example. Each sub component's condition and recommended work task and coating system is reviewed and assessed by either the administrative or engineering user to verify that the recommendation conforms with the facility's asset maintenance plan.

TABLE 10

| Attribute | Data Input Example |
|---|---|
| Accept or Change Recommend 410, 420 | Review each sub component's condition and work task recommendation and either accept or change the work task and coating system-Example: The sub component Transfer Pipe has a recommended work task of touchup, using the coating system named Acrylic Exterior. Based on the administrative or engineering users knowledge and expertise, the recommendation is changed from touchup to recoat, the coating system is accepted. |
| Schedule Work by Sub Component 430 | The schedule for the work task assigned to this sub component is entered by the administrative or engineering user-Example: The recoat of the Transfer Pipe is scheduled for June 1996. |
| Calculate Costs 440 | Based on the changed information input during the Work Management Assessment Step, the computer automatically updates the estimated cost to perform the specified work task-Example: the cost data associated with recoating the Transfer Pipe is now used to calculate the estimated cost of this work. |
| Data Operations 450 | The administrative or engineering user performs various data manipulation operations to support the strategic planning process-Example: an Executive Summary report is printed which contains the Master Component S. Pump Station, which in turn contains the Sub Component Transfer Pipe. The Work Status of this Sub Component is shown as recoat, the schedule date is June 1996 and the estimated cost is $1,087. |

Figure 5:
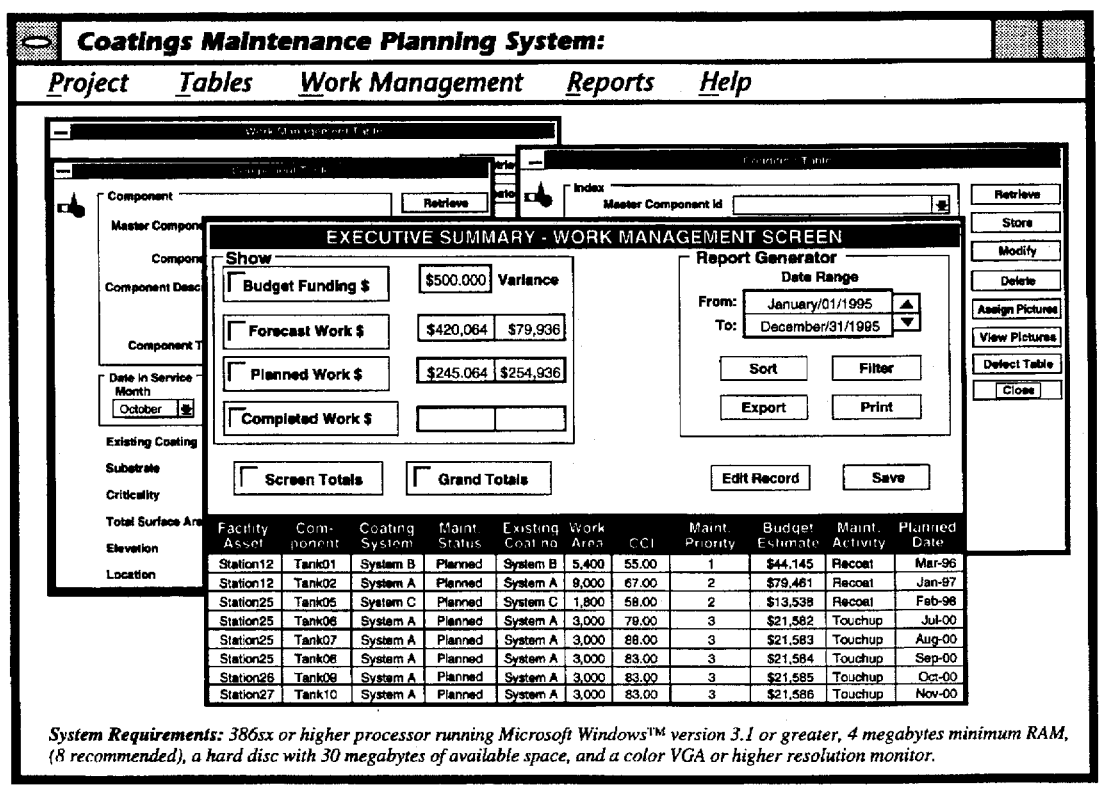
FIG. 5 illustrates an exemplary executive summary-work managment output of Step 400.

FIG. 5 illustrates an exemplary executive summary-work managment output of Step 400.

Although, the data operations substep 450 of FIG. 1B describes various types of outputs, the invention is not limited to these outputs. The invention can be used generate various types of reports such as but not limited to: Master Asset Lists, Master Asset Condition Summary, Work Management Report, Master Asset Planned Work & Summary, Master Asset or Subcomponent Priority Lists, Maintenance Activity by Master Asset List, Asset and Subcomponent Cost Data List, Maintenance Cost Data & Annual Summary List, Maintenance History List, Defect &Defect Cost Analysis List, Coating Use and Performance List, Maintenance & Safety Flags List, Condition Survey History List, and User Defined Lists.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An automated planning and maintenance program for linings and coatings in facilities comprising the steps of:
   (a) identifying facility assets having coatings and linings;
   (b) creating a maintenance history of each of the identified facility assets;
   (c) determining current conditions of the identified facility assets based on current defects in linings and coatings;
   (d) calculating maintenance recommendations based on the maintenance history and the conditions of the linings and coatings of the identified facility assets;
   (e) prioritizing the calculated maintenance recommendations; and
   (f) calculating cost of applying replacement linings and coatings by:
      i determining size of surface to be covered:
      ii determining cost of materials not being used to recover the surface;
      iii determining time needed to apply the replacement coatings, wherein steps i, ii, and iii are surface preparation cost;
      iv determining the replacement coating material cost; and
      v determining equipment cost to apply the replacement coatings.

2. The planning and maintenance computer program of claim 1, wherein step(b) further comprises the steps of:
   reporting the locations of each of the identified facility assets;
   establishing time coatings and linings were last applied;
   listing type of existing coatings and linings used on the identified facility assets;
   determining status of listed type;
   calculating square footage areas of each of the identified facility assets;
   listing last maintenance activity performed for each of the identified facility assets;
   calculating elapsed time since the last maintenance activity was performed; and
   forecasting date of next planned maintenance activity for each of the identified facility assets.

3. The planning and maintenance computer program of claim 1, wherein step(c) the step of determining the current conditions of the identified facility assets based on current defects in linings and coatings further includes the steps of:
   c(i) identifying primary defects on each of the linings and the coatings;
   c(ii) selecting a defect rating for each of the primary defects, wherein the defect rating is chosen from one of: severe, moderate and minor;
   c(iii) rating the condition of each of the linings and coatings, wherein the condition rating is chosen from one of: poor, fair and good;
   c(iv) determining square foot area affected by the primary defects of each of the identified facility assets;
   c(v) calculating percentage of the primary defect compared to square footage of the identified facility asset;
   c(vi) determining recommended maintenance for each of the identified primary defects; and
   c(vii) calculating estimated cost for the recommended maintenance.

4. The planning and maintenance computer program of claim 1, wherein the facility master components are selected from at least one of:
   storage buildings, production areas, tank farms, cracking towers, platforms, pressure vessels, pools, paper machines, power boilers, grain silos, cooling towers and docks.

5. The planning and maintenance computer program of claim 4, wherein the facility assets include sub components selected from at least one of:
   piping, structural steel members, concrete floors, overhead cranes, blowers, pumps, motors, valves, conduit, exterior doors, interior doors, windows, siding and gutters.

6. A four step process for coating and lining maintenance for industrial and commercial facilities using a computer program, the process comprising the steps of:
   (a) breaking down an industrial and commercial facility into dividable components, that includes the steps of:
      (a)(i) identifying asset groups;
      (a)(ii) defining master components of the asset groups;
      (a)(iii) defining sub components of each of the master components;
   (b) conducting a condition survey on coatings and linings for each of the dividable components;
   (c) setting coating system standards for each of the dividable components based on the condition survey; and
   (d) outputting work management recommendation reports for each of the dividable components based on the coating system standards.

7. The four step process of claim 6, wherein step (d) of outputting work management recommendation reports includes:
   d(i) evaluating work assessment recommendations;
   d(ii) scheduling work by divisible component;
   d(iii) calculating cost of applying replacement coatings by:
      d(iii)(a) determining size of surface to be covered:
      d(iii)(b) determining cost of materials not being used to recover the surface;
      d(iii)(c) determining time needed to apply the replacement coatings, wherein steps d(iii)(a), d(iii)(b), and d(iii)(c) are surface preparation cost:
      d(iii)(d) determining the replacement coating material cost; and
      d(iii)(e) determining equipment cost to apply the replacement coatings.

8. The four step process of claim 7, further comprising:
   d(iii) creating management reports;
   d(iv) reporting historical data; and
   d(v) reporting the cost and schedule data.

9. The four step process of claim 6, wherein the setting coating system standards step(c) includes:
   c(i) assigning a descriptive legend for a coating system;
   c(ii) selecting a surface preparation method chosen from at least one of:
      hand tool cleaning, power tool cleaning, white metal blast cleaning, commercial blast cleaning, brush off blast cleaning, near white metal blast cleaning, power tool cleaning to bare metal;
   c(iii) selecting coating material including descriptors selected from at least one of:

cost per gallon, percent sold by volume, dry film thickness range;

c(iv) select application method chosen from at least one of:

spray, brush and roll; and c(v) select coating system purpose selected from at least one of:

architectural, lining, protective coating, sacrificial and decorative.

10. The four step process of claim 9, wherein the setting coating system standards step(c) further includes:

c(vi) select coating system type chosen from at least one of:

touch up, recoat, replace and new construction;

c(vii) select material design basis chosen; and c(viii) calculate number of coats to be used.

11. The four step process of claim 10, further comprising the steps of:

calculating cost of applying replacement coatings by:
 i determining size of surface to be covered;
 ii determining cost of materials not being used to recover the surface;
 iii determining time needed to apply the replacement coatings, wherein steps i, ii, and iii are surface preparation cost;
 iv determining the replacement coating material cost; and
 v determining equipment cost to apply the replacement coatings.

12. The four step process of claim 6, wherein conducting survey step(b) includes:

b(i) selecting exposure types of the dividable components from at least one of:

atmospheric, ultraviolet, acidic, alkaline, immersion, splash zone, salt spray and high temperature;

b(ii) rating substrate condition of the dividable components from at least one of:

intact, superficial damage, structural damage, and structurally failed;

b(iii) rating existing coating integrity from at least one of: excellent, good, fair, and poor;

b(iv) selecting visual view of the dividable components from at least one of:

hidden, visible and high profile;

b(v) rating appearance of the dividable components from at least one of:

excellent, good, fair, and poor; and measuring adhesion of the existing coating from at least one of:

excellent, good, fair and poor;

b(vi) selecting observed defects from at least one of:

chalking, fading, mildew, dirt, blushing, discoloration, checking, alligatoring, delamination-intercoat, blistering-intercoat, pinholing, pinpoint rusting, general rusting, cracking, blistering to substrate, flaking and peeling.

b(vii) measuring dry film thickness of the existing substrate;

b(viii) inputting hazardous conditions, if any; and b(ix) determining inspection frequency.

13. The four step process of claim 12, wherein conducting survey step(b) further includes:

b(x) inserting surveyor and inspector observed comments; and b(xi) scanning a digital photograph of the dividable components.

14. The four step process of claim 12, wherein conducting survey step(b) includes:

recommending a work task chosen from at least one of: touchup, re-coat, replace and new construction.

15. The four step process of claim 14, wherein conducting survey step(b) includes:

recording application cost multipliers chosen from at least one of:

barricades, scaffolding, rigging, and confined spaces.

16. A method for the planning and maintenance of coatings and linings used in industrial and commercial facilities to be performed by a computer, the method comprising the steps of:

(a) breaking down an industrial and commercial facility by:
 (a)(i) identifying asset groups;
 (a)(ii) defining master components of the asset groups;
 (a)(iii) defining sub components of each of the master components;

(b) conducting a condition survey on coatings and linings for the sub components by:
 b(i) selecting exposure type of an existing coating;
 b(ii) selecting operating environment where the existing coating is situated;
 b(iii) rating substrate condition of the existing coating;
 b(iv) determining a sub component visual view of the existing coating;
 b(v) rating appearance of the existing coating;
 b(vi) measuring adhesion of the existing coating;
 b(vii) selecting observed defects of the existing coating;
 b(viii) measuring dry film thickness of the existing coating;
 b(ix) determining hazardous conditions;
 b(x) determining inspection frequency;
 b(xi) recommending work task to recoat; and
 b(xii) recording application cost multipliers;

(c) setting coating system standards for each of the sub components based on the condition survey by:
 c(i) selecting surface preparation method;
 c(ii) selecting type of replacement coating to be applied;
 c(iii) determining application method and purpose of the replacement coating;
 c(iv) selecting number of the replacement coatings to be applied; and
 c(v) calculating cost of applying the replacement coatings by:
  c(v)i determining size of surface to be covered:
  c(v)ii determining cost of materials not being used to recover the surface;
  c(v)iii determining time needed to apply the replacement coatings, wherein steps c(v)i, c(v)ii, and c(v)iii are surface preparation cost:
 c(v)iv determining the replacement coating material cost
 c(v)v determining equipment cost to apply the replacement coatings; and (d) outputting work management recommendation reports for each of the sub components based on the coating system standards.

* * * * *